March 19, 1963 R. L. SMIRL 3,082,018
LEVELING VALVE MECHANISM
Filed June 23, 1958 5 Sheets-Sheet 1

Inventor:
Richard L. Smirl
By: Frank R. Thienpont
Atty.

March 19, 1963

R. L. SMIRL 3,082,018

LEVELING VALVE MECHANISM

Filed June 23, 1958

Inventor:
Richard L. Smirl
By: Frank R. Thieront
Atty.

United States Patent Office 3,082,018
Patented Mar. 19, 1963

1

3,082,018
LEVELING VALVE MECHANISM
Richard L. Smirl, La Grange Park, Ill., assignor to Borg-Warner Corporation, Chicago, Ill., a corporation of Illinois
Filed June 23, 1958, Ser. No. 743,558
7 Claims. (Cl. 280—124)

My invention relates to air suspension systems for vehicles and more particularly to controlling or leveling valve mechanisms for controlling the proper amount of air in vehicle air springs.

It has been previously proposed to utilize a number of air springs for suspending or supporting a vehicle body and frame with respect to the road wheels of the vehicle. Such air springs may comprise flexible bellows in which a volume of air is maintained. These bellows cushion the vehicle body quite well from road shock and for the purpose of doing so are maintained relatively soft. A number of these air springs are used in a vehicle, such as one at each of the four corners of the vehicle frame. Since the air springs are quite soft, the addition of a load in the vehicle tends to cause the vehicle body to lean in the direction of the load.

It has, accordingly, been previously proposed to provide a source of air pressure and a valve mechanism for supplying additional air from the air source to the air spring bearing the load, so as to turn the vehicle body back into a horizontal normal position from its leaning position. Such a valve mechanism is also operative, when the load is removed, for exhausting the air spring so as to relieve sufficient air therefrom to return the vehicle body to normal position with respect to the vehicle wheels. Such a valve mechanism, as has previously been proposed, in general, is quite complicated and expensive; and it is, accordingly, an object of the present invention to provide an improved valve mechanism for the purpose of controlling air in the springs which is very simple in construction and economical to manufacture.

Such valve mechanisms previously proposed have included an air inlet valve connecting an air spring with a source of air pressure, and an exhaust valve for the air spring. These air inlet and exhaust valves have been rather complicated and expensive in themselves, and it is, accordingly, an object of the present invention to provide improved valve mechanism with air inlet and exhaust valves comprising as working parts, the usual valve cores used in connection with the ordinary pneumatic tires of automobiles, which, due to the very great quantities manufactured for use in such tires may be bought for only pennies apiece. This is a further improved valve mechanism over that described in my now pending application, Serial No. 618,837, filed October 29, 1956.

A further object is to provide a restrictor valve mechanism in conjunction with the leveling valve which will provide a gradual leveling correction when the vehicle comes out of a curve.

Another object is to provide a relay-restrictor valve associated with an air spring which may assome a fast-flow or slow-flow position, depending on the requirements of the air spring connected therewith.

It is a further object of the invention to actuate the relay-restrictor valve between its slow flow and fast flow positions by means of a solenoid and to in turn actuate the solenoid by switches controlled by speed or by the opening and closing of the vehicle door.

Air spring controlling valve mechanisms preferably include a mechanism for preventing the actuation of the inlet or exhaust valves by ordinary short duration road shocks, so that inflation of the air springs is automatically regulated to maintain a constant average standing height of the vehicle body regardless of load, the mechanisms taking no notice of the more rapid vertical motions of the road wheels.

Accordingly, it is also an object of the invention to provide an improved damping mechanism for use in connection with an air spring leveling valve mechanism which solves the problem of hunting in the leveling process.

It is a more particular object of the invention to provide an improved damping mechanism which produces a greater damping action during a certain portion of the movement of an air valve actuating member than in the other portions of its movement. Still more particularly, it is an object to provide such a damping mechanism comprising a vane movably disposed within a cavity containing a viscous liquid, with the cavity having its edges closer to the vane at a central neutral position of the vane than when the vane is rotated so as to provide a greater damping action on the vane in its central neutral position, so as to eliminate hunting action of the valve actuating member.

Another object of the invention is to provide an exhaust check valve mechanism as part of the leveling valve mechanism to serve as a safety feature to prevent continuous exhausting of air from an air spring should an exhaust valve stick open and thereby maintain a certain minimum pressure in the air spring.

A still further object is to provide an inlet check valve mechanism to prevent leakage of air from the air spring if the inlet valve should stick open or if there should be a leak in the system, such as in an air accumulator, for example.

The invention consists of the novel constructions, arrangements and devices to be hereinafter described and claimed for carrying out the above stated objects and such other objects, as will be apparent from the following description of preferred forms of the invention, illustrated with reference to the accompanying drawings, wherein:

Like characters of reference designate like parts in the several views.

Figure 1:
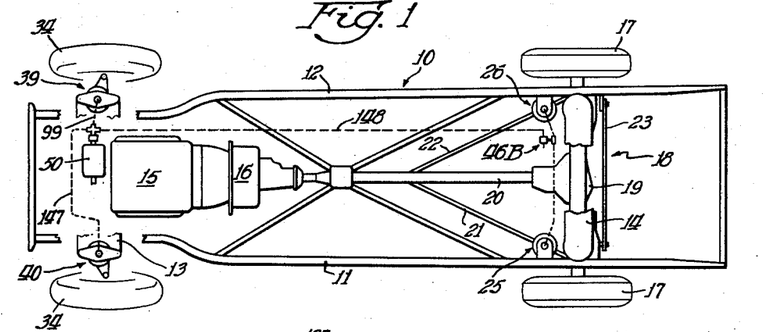
FIG. 1 is a top view of an automobile chassis in which my improved leveling valves for air springs are installed.

Referring now to the drawings and particularly to FIG. 1, my improved vehicle body leveling valve mechanism is shown installed on an automotive vehicle having a frame 10 with two side frame members 11 and 12. The frame members are connected together by a plurality of cross frame members including the cross frame members 13 and 14.

The vehicle includes a conventional engine 15 connected to the usual transmission 16. The rear driving road wheels 17 of the vehicle are mounted on a rear axle assembly 18 comprising a differential 19. The usual propellor shaft 20 is drivingly disposed between the differential 19 and the transmission 16.

Rear axle strut rods 21 and 22 are provided between the propellor shaft 20 and the rear axle assembly 18, and a radius rod 23 is connected between one end of the axle assembly and the frame 10. The usual automobile body 24 (FIG. 11) is fixed in the conventional manner on the frame 10.

Figure 3:
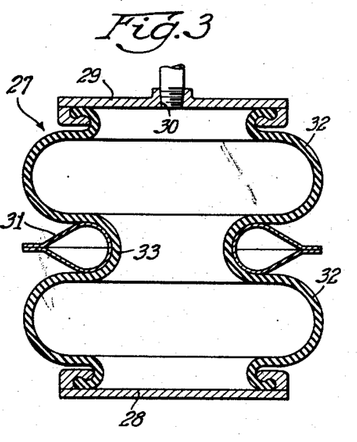
FIG. 3 is a vertical sectional view of one of the air springs.

A pair of air springs 25 and 26 are disposed between the side frame members 11 and 12 and the rear axle strut rods 21 and 22, respectively, for supporting the frame 10 and body 24 with respect to the rear axle assembly 18. Each of the air springs 25 and 26 comprises essentially a flexible bellows 27 (FIG. 3) which may be composed of layers of fabric and rubber-like material, for example. The bellows 27 are each fixed with respect to a bottom plate 28 and a top plate 29, so as to be air tight. An opening 30 is provided in the upper plate 29 for the admission of air pressure into the bellows 27 as will be described. An encircling metal band 31 is disposed around the middle of the bellows 27, so that the bellows has two large diameter folds 32, with a small diameter fold 33 therebetween.

The front dirigible road wheels 34 (FIG. 2) of the vehicle are rotatably disposed on knuckle supports 35 and 36, the knuckle support 35 being for the right front wheel and the knuckle support 36 being for the left front wheel. Each of the knuckle supports 35 and 36 is movably connected to the frame 10 by means of a lower control arm 37 and an upper support arm 38 which are respectively pivotally mounted to the cross frame member 13.

Figure 2:
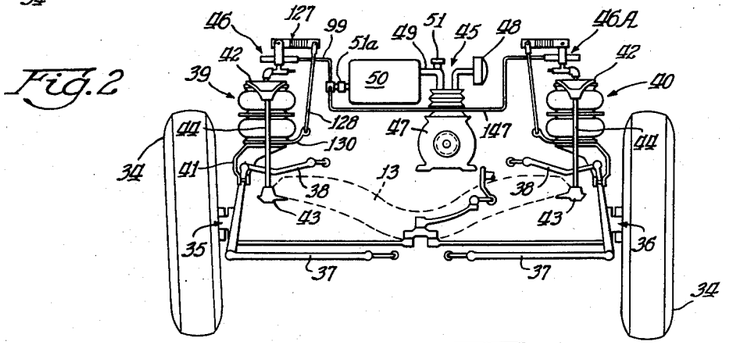
FIG. 2 is a front view of the chassis taken on an enlarged scale.

A pair of air springs 39 and 40 are effectively disposed between the cross frame member 13 and the knuckle supports 35 and 36, respectively. The air springs 39 and 40 are identical in detail with the air springs 25 and 26 as previously described. The lower plate 28 of the air spring 39 is fixed on a mounting bracket 41, clamped on the knuckle support 35, and the upper plate 29 of the air spring 39 is fixed to a bracket plate 42 which is connected with a bracket 43 on the cross frame member 13 through the intermediary of a rod 44. The air spring 40 is similarly effectively disposed between the knuckle support 36 and the cross frame member 13 by means of similar brackets 41, 42, and 43 and rod 44.

The air springs 25, 26, 39 and 40 function to yieldably support the vehicle body 24 and the frame 10 with respect to the axle assembly 18 and the front wheels 34 due to air compressed within the bellows 27 of these air springs. An air pressure source 45 is provided for maintaining air pressure in the bellows 27 of the air springs 25, 26, 39 and 40; and in connection with both front wheels, 34, I provide my improved leveling valve mechanism 46 and 46A, and I provide such a valve mechanism 46B which functions to control the air pressure simultaneously within both of the rear air springs 25 and 26. It will be appreciated that other arrangements may include four leveling valve mechanisms, i.e., one for attachment to each air spring or two leveling valve mechanisms in the rear and one on the front portion of the vehicle.

The source of air pressure comprises an air compressor 47 of any suitable conventional construction having an air inlet 48 and an air outlet 49. The compressor 47 is driven from the vehicle engine 15 by any suitable connection, as from the usual fan belt. The compressor discharges into a pressure accumulator 50 which may constitute simply a closed sheet metal reservoir. A relief valve 51 of any suitable conventional construction may be connected to the outlet 49 so as to prevent an excessive build up of pressure in the accumulator and to maintain the air pressure in the accumulator 50 at some predetermined maximum value, such as, for example, between 150 to 300 p.s.i. A pressure regulator 51a may be installed at the outlet from the accumulator to provide a substantially constant regulated pressure to the inlet of the leveling valve mechanisms.

Figures 4, 5:
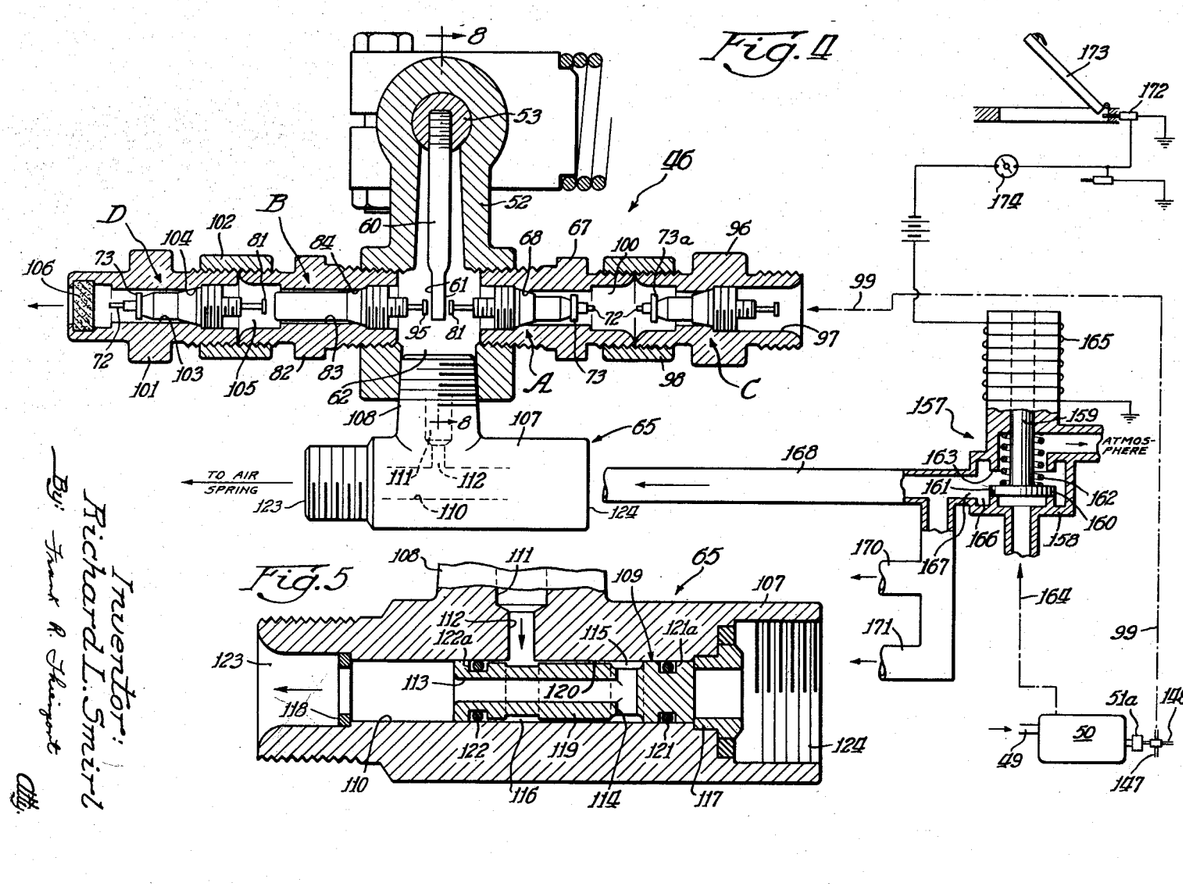
FIG. 4 is a vertical sectional view of one of my improved leveling valves in combination with a T-relay valve assembly, the latter being shown schematically connected to a solenoid actuating device.
FIG. 5 is a partial enlarged vertical sectional view of the relay valve assembly of FIG. 4 showing a restrictor valve therein.
Figure 8:
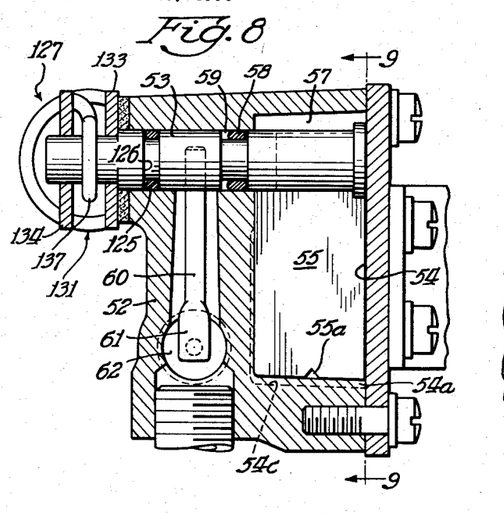
FIG. 8 is a sectional view taken on line 8—8 of FIG. 4.
Figure 9:
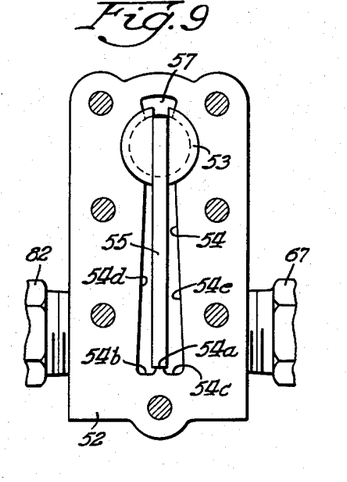
FIG. 9 is a sectional view taken on line 9—9 of FIG. 8.

The leveling valve mechanism 46 for the right front wheel 34 comprises a valve body 52 having a shaft 53 extending therethrough and rotatable therein. A cavity 54 is provided in the valve body 52, and a vane 55 is fixed on the shaft 53, so as to be swingable back and forth in the cavity 54. The vane 55 fits loosely in cavity 54 and in one particular embodiment, satisfactory results were obtained with .005 to .010 inch clearance between the edges of the vane and the surrounding sides of the cavity 54. The effective clearance between the vane 55 and the sides of the cavity 54 may also be increased, if desired, by providing a small notch 55a in an edge of the vane. The bottom of the cavity 54 has a raised ridge 54a and troughs 54b and 54c on either side thereof, the purpose of which will be hereinafter explained. The sides 54d and 54e of the cavity 54 may be spaced at a predetermined distance apart to limit the swing of the vane 55. A heavy viscous fluid is provided in the cavity 54 for delaying swinging movement of the vane 55 in the cavity 54 when a rotative force is put on the shaft 53. A heavy mineral oil, for example, may be used; however, preferably, a fluid which is not so subject to viscosity changes with temperature changes is preferred. A silicone fluid having a viscosity (at 25° C.) between 60,000 and 100,000 centistoke has been found to give good results. These are linear polydimethylsiloxanes chain stopped with trimethylsilyl groups in which the viscosity of the fluid is regulated by the chain length of the dimethylsiloxane unit, disclosed, for example, in Winton I. Patnode Patents Nos. 2,469,888 and 2,469,890, both issued May 10, 1949. Such a silicone fluid has little change of viscosity with changes in temperature and, incidentally, has the additional advantage of high resistance to mechanical shear breakdown.

The liquid in the cavity 54 extends and contracts to some extent with temperature changes, and I, therefore, provide an air cavity 57 and a movable O ring seal 58 about the shaft 53 for allowing for expansion of the liquid body in the cavity 54. As shown in FIGS. 8 and 9, the air cavity 57 is disposed above the shaft 53 in the upper part of the valve body 52, and the fluid may seep around the shaft 53 and into the cavity 57 whenever it expands unduly within the cavity 54. The O ring seal 58 is disposed in a circumferential groove 59 of greater length than the diameter of the seal 58, so that the seal 58 may move longitudinally of the shaft 53 in the groove 59. Thus, as the fluid in the cavity 54 increases in volume with increases in temperature, the fluid may seep around the shaft 53 so as to move the seal 58 to the left as seen in FIG. 8 and increases in effect the cavity volume for the fluid. If desired, either the slidable O ring seal 58 or the cavity 57 may be used for the purpose of providing augmented volume for the liquid in the cavity 54 to the exclusion of the other, and both the seal 58 and the cavity 57 need not be simultaneously provided. A lever 60 in the form of a stud having flats 61 on its free end is fixed on the shaft 53, the flats 61 extending into a chamber 62 of the valve body 52.

The leveling valve mechanism 46, FIG. 4, also comprises an inlet valve A and an exhaust valve B, a non-return inlet check valve C associated with the inlet valve A, an exhaust check valve D associated with exhaust valve B and a solenoid operated relay valve assembly 65. The inlet valve A and the exhaust valve B are adapted to be actuated by the lever 60.

The inlet valve A is mounted in a nipple 67 which is screw-threaded into the valve body 52. The valve A (FIG. 15) is conventional in construction, being of the type commonly used for automobile tires. The nipple 67 has a passage 68 therethrough adapted to receive the tapered sleeve portion 69 of the valve A. The tapered sleeve portion 69 has a circular seal 70 embedded in it. A threaded sleeve 71 is coupled to but is rotatable with respect to the tapered sleeve portion 69. The threaded sleeve 71 is threaded into the inner end of the passage 68 so as to hold the circular seal 70 in sealing relationship with respect to the tapered portion of the passage 68.

Figure 15:
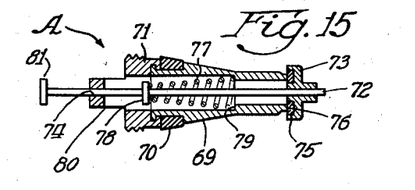

A stem 72 having an enlarged head 73 thereon extends through an opening 74 in the sleeve 71. The head 73 carries a sealing washer 75 adapted to make a tight seal with the end lip 76 of the tapered sleeve portion 69.

The sealing washer 75 is yieldably held in sealing relationship with the lip 76 by means of a compression spring 77 disposed between an annular enlargement 78 on the stem 72 and a shoulder 79 provided in the sleeve portion 69. An air hole is provided in the sleeve 71. The stem 72 is provided with an enlarged flattened head 81 adapted to be contacted by one of the flats 61 on the lever 60.

The exhaust valve B is disposed in a nipple 82 which has a longitudinal passage 83 extending therethrough. The passage 83 is provided with a tapered portion 84. The valve B comprises a tapered sleeve portion 85 (FIG. 14) disposed to fit in the tapered portion 84. A sealing ring 86 of yieldable material is provided in the tapered portion 85 and is adapted to seal the valve part 85 in the tapered passage portion 84. A threaded sleeve 87 is coupled but is rotatable with respect to the tapered sleeve portion 85, and the sleeve 87 is screwed into the inner end of the passage 84 so as to hold a yeildable sealing ring 86 tightly in the tapered passage portion 84.

Figure 14:
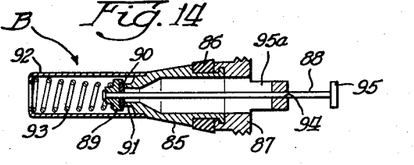
FIGS. 14 and 15 are respectively longitudinally sectional views of two different valve cores used in my improved controlling valves.

A stem 88 extends through the tapered valve portion 85 and has a head 89 fixed on one end. The head 89 has a ring 90 of yeildable sealing material fixed thereto which is adapted to make an air-tight seal with the end lip 91 of the valve portion 85. A retainer sleeve 92 is fixed to the valve portion 85, and a spring 93 is disposed between the inturned end of the sleeve 92 and the head 89 for yieldably holding the head 89 and its sealing ring 90 in sealing relationship with the lip 91. The spring 93, for purposes which will hereinafter be described is considerably stronger than the spring 77 in the valve A.

The stem 88 extends through an opening 94 provided in the sleeve 87, and is provided with a flattened head 95. An air opening 95a is also provided in the sleeve 87. The valve B is also conventional in construction, being of a type commonly used for automobile tires. The non-return inlet check valve C is of the same construction and has the same parts as inlet valve A. The valve C is disposed in a nipple 96. The nipple 96 has a passage 97 which is an extension of passage 68 when the nipple 96 is joined to nipple 67 by means of a collar 98. The passage 97 is connected to the air pressure accumulator 50 by a conduit 99. As will be noted, the valves C and A are reversed with respect to each other, the enlarged heads 73 being positioned adjacent each other.

When the nipples 67 and 96 are connected together by the collar 98 there is formed a chamber 100 between the valves A and C, this chamber 100 forming a connecting passage between the passages 68 and 97. The valves A and C are disposed in a longitudinal relationship to each other with the corresponding heads 73 and 73a lying next to each other in the chamber 100.

Valve D is also of the same construction as valve A and has the same parts. Valve D is disposed in a nipple and has the same parts. Valve D is disposed in a nipple 101. Nipple 101 is connected to nipple 82 and is held in longitudinal arrangement therewith by a collar 102. The nipple 101 has a passage 103 therethrough, and has thereon a tapered portion 104. The threaded sleeve 71 of valve D is threaded into the inner end of the passage 103 so as to hold its circular seal 70 in sealing relationship with respect to a tapered portion of the passage 103. It will be noted that valve D is disposed with its head 81 extending to the right as seen in FIG. 4, the same as valve C.

When the nipple 101 with the valve D assembled therein is connected to the nipple 82, with the valve B assembled therein, by means of collar 102 there is formed a chamber 105 between the valves B and D. The passage 103 may either be open to the atmosphere or to an exhaust pressure accumulator. If the passage 103 is open to the atmosphere a silencer 106 made of porous bronze, for example, may be inserted in the outer end of the passage 103. This also acts as a filter to prevent valve D from becoming clogged with foreign particles.

As stated before, the leveling valve mechanism 46 also comprises a relay valve assembly 65. A preferred embodiment of the relay valve assembly 65 is shown in FIG. 4 and a partial section thereof is shown in FIG. 5.

This preferred embodiment of the relay valve assembly 65 comprises a generally T-shaped valve body 107. The valve body 107 is joined to the valve body 52 of the leveling valve mechanism 46 by a threaded portion on the vertical stem 108 of the T as shown in FIG. 4. The relay valve assembly 65, further comprises a restrictor slide valve 109 (see FIG. 5) freely slidably disposed in the bore 110, the bore 110 being longitudinally formed in the cross arm of the T. The vertical stem 108 has formed therein a bore 111. The bore 110 is connected with the bore 111 through the smaller passage 112 which intersects the bore 110. When the valve body 107 is joined with the valve body 52 the bore 111 is in communication with the chamber 62 of the valve body 52.

The restrictor slide valve 109 has formed therein a longitudinal axial conduit 113 which intersects with a transverse passage 114 in the valve 109. A circumferential groove 115 at one end of the valve 109 is formed on the valve 109 and intersects the transverse passage 114. At the other end of the valve 109 there is formed another circumferential groove 116. When the valve 109 is in its extreme right hand position as limited by the stop 117, the circumferential groove 116 is in communication with the passage 112. When the slide valve 109 is in its extreme left hand position, as limited by the stop 118, a pressed-in washer, for example, the circumferential groove 115, the passage 114 and the conduit 113 are in communication with the passage 112.

The portion 119 of the valve 109 between the grooves 115 and 116 is of a slightly smaller diameter than the end portions of the slide valve 109. This smaller diameter provides a small clearance 120 between the bore 110 and the portion 119 for a predetermined amount of air leakage of the order of 200–300 cu. in. per minute, for example, between the passage 112 and the passage 114 when the slide valve 109 is in its right hand position, the purpose of which will be hereinafter explained. O sealing rings 121 and 122 are provided respectively in grooves 121a and 122a at each end of the valve 109 to prevent the leakage of air past these points.

An outlet 123 at one end of the cross-arm of the T is provided in the valve body 107 for communication with the opening 30 in the upper plate 29 attached to the air spring 39 for admission of air to the air spring 39. An opening 124 is provided in the other end of the cross arm of the T for communication with a solenoid-controlled air pressure source to be hereinafter described.

The stems 72 and 88 of the valves A and B extend into the cavity 62 in the valve body 52 and are disposed adjacent to opposite flats 61 on the lever 60, so that the flats can contact the stems and move them. Air under pressure exists in the cavity 62, the bore 111, the passage 112, the clearance 120, the conduit 113 and the outlet 123 leading to the air spring 39. Therefore, I preferably provide an O-type sealing ring 125 within a circumferential groove 126 in the shaft 53. The sealing rings 58 and 125 are disposed on opposite sides of the cavity 62 and seal the air pressure within the cavity 62.

An arm 127 (see FIGS. 12 and 13) is fixed on the shaft 53 and is connected at its outer end by means of a connecting rod 128 (FIG. 2) with a bracket portion 130 on the bottom plate 28 of the air spring 39 for each of the valves 46 and 46A. The arm 127 comprises a clevis 131 which is clamped on the shaft 53 by means of a screw 132. The clevis has two longitudinally extending side portions 133 and 134 (FIG. 13) which contact the end convolution 135 of a coiled cantilever spring 136. The side portions 133 and 134 are tightly held in contact with the end of the spring 136 by means of the end of the spring 137 which is looped about the shaft 53 and is held in stress by the shaft 53. The clevis portion 131 is provided with a reduced end portion 138 which extends inside the spring 136 and holds it fixed with respect to the clevis 131.

Figures 11, 12, 13:
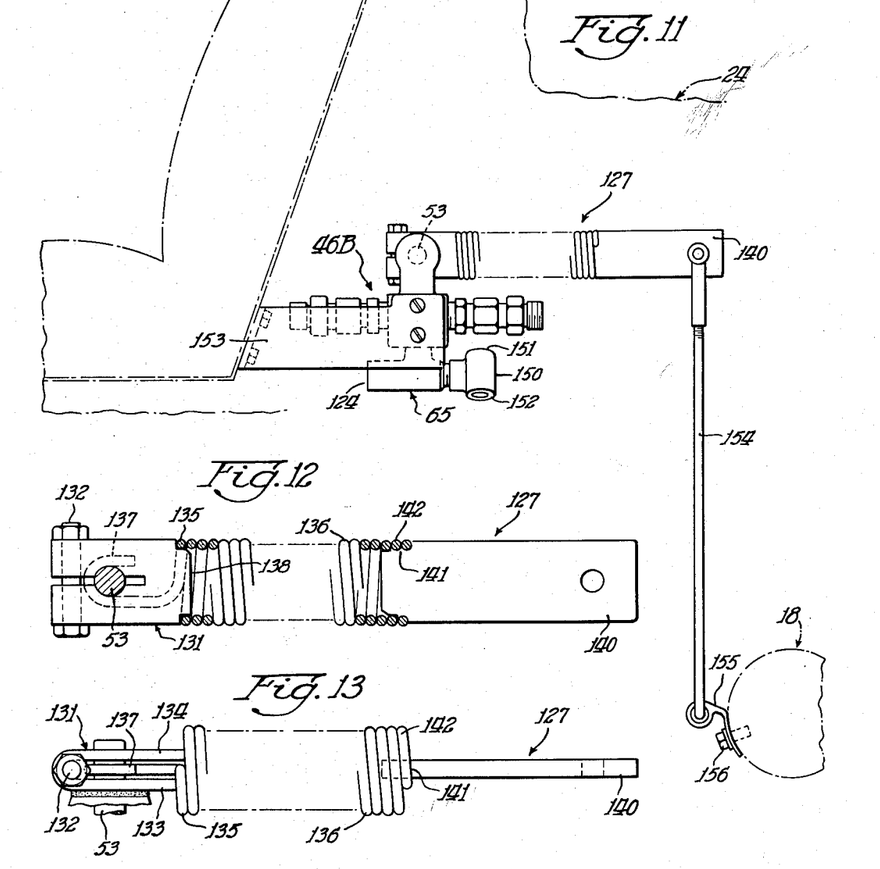
FIG. 11 is a side view of one of my controlling valves located at the rear of the vehicle chassis.
FIG. 12 is a side view of an arm assembly used with one of my improved valves.
FIG. 13 is a top view of the arm assembly shown in FIG. 11.

The arm 127 includes an end 140 which comprises a rectangular strip of metal. The end 140 has a reduced threaded portion 141 which is screwed tightly into the spring 136 and tightly engages the end convolutions 142 of the spring 136.

As previously mentioned, the looped spring end 137 is stressed out of its free position with respect to the rest of the spring 136 when the shaft 53 is passed through the loop spring end. In addition to this stressing, the spring 136 is pre-loaded, that is, in its free condition or in its condition as shown in FIGS. 12 and 13 the convolutions of the spring 136 are tightly in contact with each other, so that it requires a pre-determined force in order to bend the spring and bring the spring convolutions out of contact with each other.

The air pressure in the air spring 40 on the left side of the vehicle is controlled by means of a valve mechanism 46A which is identical to the valve mechanism 46 and by means of an identical arm assembly 127 and connecting rod 128. The nipple 96 of the valve mechanism 46A is connected by means of a conduit 147 with the accumulator 50. As illustrated in FIG. 2, the valve mechanism of FIG. 4 is turned around so that the inlet valve C of valve mechanism 46A is on the left and connected to conduit 147.

The air springs 25 and 26 on the rear of the vehicle are controlled by means of a valve mechanism 46B (see FIG. 11) which is identical with the valve mechanism 46. The nipple 96 of the valve mechanism 46B is connected by means of a conduit 148 with the regulator 51a. The outlet 123 of the valve 107 may be connected by means of a conduit 150 and branch conduits 151 and 152 with the openings 30 of the air springs 25 and 26. The valve mechanism 46B is mounted on a portion of the vehicle body 24 which is just behind the rear seat of the vehicle, by means of a bracket 153. The arm assembly 127 for the valve mechanism 46B is connected by means of a connecting rod 154 to the rear axle assembly 18. The rod 154 extends through a bracket 155 fastened to the axle assembly 18 by means of a stud 156.

It will be appreciated that instead of using one leveling valve mechanisms 46B for controlling both of the rear air springs 25 and 26, two leveling valve mechanisms may be installed to separately control each of the air springs 25 and 26 in substantially the same manner as leveling valve mechanisms 46 and 46A are utilized to control the air springs 39 and 40 respectively at the front of the vehicle.

It has been mentioned that the spring 136 is pre-loaded, that is, that the convolutions of the spring are tightly but yieldably held in contact by the inherent stress of the spring. Due to this pre-stressing, a certain force must be put on the end of the arm end 140 before the convolutions begin to separate. This has been adequately explained and graphically illustrated in my co-pending application S.N. 618,837 and since this portion of the mechanism operates in the same manner no further description is needed herein.

There is also diagrammatically illustrated in FIG. 4 a solenoid operated valve 157. The valve 157 comprises a valve body 158, a piston 159 reciprocable in the valve body 158, the piston having thereon a valve head 160 normally seating on a valve seat 161 under the pressure of a spring 162 and on valve seat 163 against the pressure of the spring 162. The valve body 158 is connected to the accumulator 50 as an air pressure source, by means of a conduit 164. An electrical solenoid coil 165 may be energized by means to be hereinafter described for actuating the piston 159 against the pressure of the spring 162 to draw the valve head 160 from its seat 161 and hold it on the seat 163. The actuation of this piston permits air to flow from the pressure source through the conduit 164 into a chamber 166 and out through the conduit 167 and into conduits 168, 170 and 171 each of which are respectively connected with the openings 124 of the relay valve assemblies 65 of the leveling valve mechanisms 46, 46A and 46B. Thus, the restrictor valve is moved to an open position to permit fast flow of air into or out of the respective air springs depending on what type of action is called for by the position of the vehicle body, as later more fully described.

The coil 165 may be energized in a variety of different ways. The illustration in FIG. 4 shows the coil 165 operated by a door switch 172, the door switch being actuated by the opening of a door 173 of the vehicle. This prepares the whole mechanism for a fast transfer of air from or to the air springs in contemplation, for example, of people getting in or out of the car. The vehicle ignition switch 174 must, of course, be turned to an "on" position for the completion of the electrical circuit necessary to excite the coil 165. When the electrical signal is broken, thus deenergizing the coil 165, the valve head 160 is returned to its seat 161 and the air in the passage 167 is allowed to re-attain atmospheric pressure, thus permitting the restrictor slide valve 109 to return to a slow-flow position.

Figure 6:
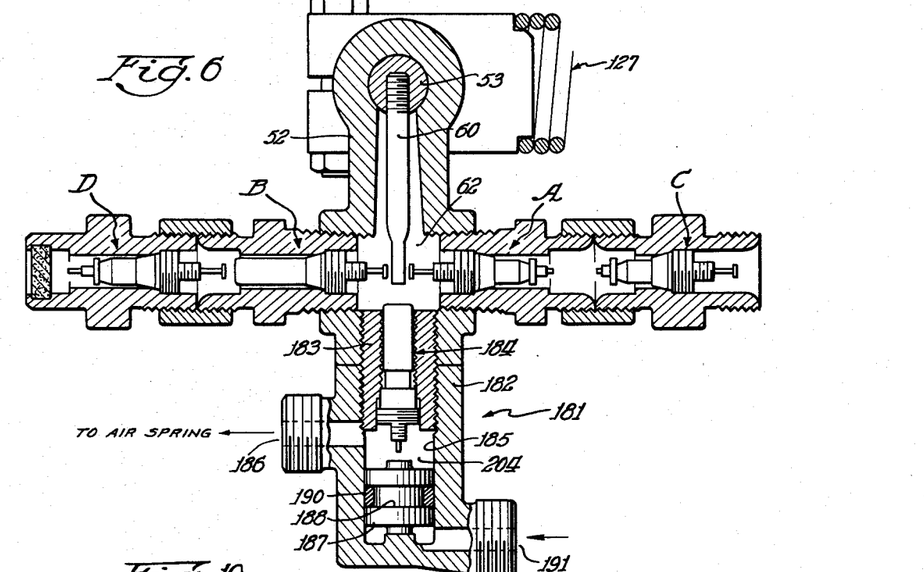
FIG. 6 is also a sectional view of the same leveling valve as shown in FIG. 4 except that it is shown in combination with another embodiment of a relay valve assembly, this relay valve assembly also being adapted to be connected to a solenoid actuating device.
Figures 7, 10:
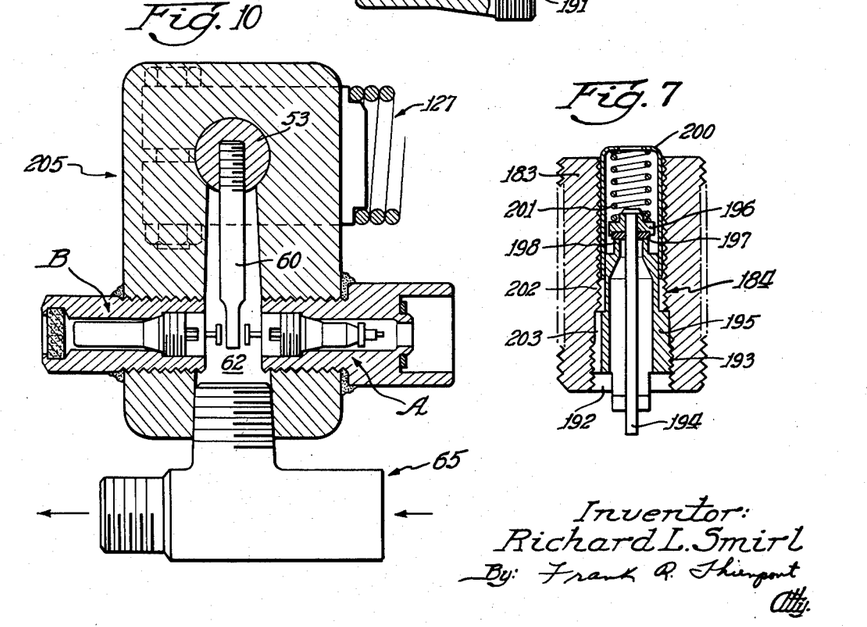
FIG. 7 is an enlarged sectional view of a portion of the relay valve assembly shown in FIG. 6.
FIG. 10 is another embodiment of a leveling valve in combination with a T-relay valve assembly.

Another embodiment of a relay valve assembly 181 is illustrated in FIG. 6 and is shown in its attached position to the valve body 52. This relay valve assembly 181 comprises a valve body 182 which is joined to the valve body 52 of the leveling valve mechanism 46 by means of a threaded liner 183. In the liner 183 is disposed a restrictor valve 184 which is of substantially the same construction as the exhaust valve B of the valve mechanism 46. FIG. 7 shows the restrictor valve within the liner in cross-sectional detail. The valve body 182 has formed therein a bore 185 into which one end of the liner 183 is threadedly inserted. Also formed in the valve body 182 is an outlet passage 186 which communicates with an air spring 39, for example. Within the bore 185, there is disposed a reciprocable sliding piston 187. The piston 187 has formed therein a circumferential groove 188 for holding an O sealing ring 190. The piston 187 by its upward movement will actuate the stem of the restrictor valve 184 as hereinafter described. The valve body 182 also has formed therein an inlet passage 191 for connection to a solenoid actuated air pressure source (not shown) for actuating the piston 187. As more clearly illustrated in FIG. 7, the restrictor valve 184 is mounted in the passage 192 of the liner 183, by means of the threaded portion 193. A stem 194 through the main body portion 195 of the valve 184 has fixed thereon a head 196. The head 196 is fitted with a sealing material 197 adapted to form a seal with the end lip 198 of the main body portion. Disposed between the head 196 and a liner 200 is a pring 201 for holding the head 196 in sealing relation with the end lip 198. Formed in the passage 192 of the liner 183 is an inside thread 202 which provides a spiral clearance space between the liner 200 and the passage 192 of the liner 183. In the main body portion 195 there is formed a notch 203 of about .03 inch in width, for example. This extends through the threaded portion of the main body portion 195 so that together with the inside thread 202 there is formed a continuous, but restricted, communication between the chamber 62 of the valve body 52 and a chamber 204 of the valve body 182. The restrictor valve 184 takes its name from the fact that even in the closed position, a predetermined amount of air of the order of about 200 cu. in./min. is permitted to flow between the chamber 62 of the leveling valve mechanism and the chamber 204 due to the clearance provided by the inside thread 202 of the liner 183 and the notch 203. The restrictor valve 184 is forced into an open position when the piston 187 is acted upon by a solenoid-actuated pressure source. When this occurs, the valve stem 194 is forced into an upward position so that the spring 201 is compressed and the head 196 and the sealing material 197 are lifted from the lip. This, then, conditions the relay valve assembly for a fast flow of air between the chamber 62 of the valve body 52 and the chamber 204 of the valve body 182. The inlet passage 191 of the relay valve assembly 181 may be connected to a solenoid operated air pressure source in substantially the same manner as the opening 124 of the relay valve assembly 65 as described above.

Another embodiment of a leveling valve mechanism 205 together with a preferred embodiment of a relay valve assembly 65 as shown in FIG. 10 is similar to the valve mechanism 46 except that the valve mechanism 205 does not have a non-return inlet check valve or an exhaust check valve. It must be explained here that either a non-return inlet check valve similar to C or else an exhaust check valve similar to D may be added to the embodiment illustrated in FIG. 10.

In operation the leveling valves 46, 46A and 46B function to maintain a desired amount of air in each of the air springs 39, 40, 25 and 26, respectively, which does not change unless the position of the vehicle frame 10 and the vehicle body 24 changes with respect to the wheels 34 and 17. With the air springs having this predetermined amount of air in them, the usual road shocks from the road wheels 34 and 17 are absorbed for the most part by the air springs.

The air spring 39, as has been explained, is positioned on the bracket 41 fixed to the knuckle support 35, and the top plate 29 of the air spring 39 is fixed with respect to the right portion of the front cross member 13 by means of the brackets 42 and 43 and the connecting rod 44. Thus, the usual road shocks applied on the knuckle support 35 from the right road wheel 34 is transmitted to the lower plate 28 of the air spring 39. Then the flexible bellows 27 together with the air within the bellows 27 expands and contracts in accordance with the shocks, so that very little of the road shocks are transmitted to the front cross member 13 of the frame 10 and to the vehicle body 24 through the connecting rod 44. The air spring 40 likewise absorbs the usual road shocks on the knuckle support 36 on the left side of the vehicle so that these road shocks are not transmitted through the connecting rod 44 on this side of the vehicle to the left end of the front cross member 13.

With reference to the rear end of the vehicle, road shocks from the rear wheels 17 are applied to the rear axle assembly 18 and thereby to the rear axle strut rods 21 and 22. The air springs 25 and 26 are positioned between the rods 21 and 22 and the side frame members 11 and 12, and thus, the usual shocks on the axle assembly 18 and rods 21 and 22 are absorbed by the flexible bellows 27 and by the air in the bellows of the air springs 25 and 26 and are not transmitted to the side frame members 11 and 12 and to the body 24.

The operation of the leveling valve mechanism 46 of FIG. 4 in conjunction with the air spring 39 will now be described. The leveling valve mechanism 46 functions to maintain a predetermined amount of air in the bellows 27 of the air spring 39, unless the knuckle support 35 moves to a different position relative to the right end of the front cross member and remains in this position for more than a predetermined period of time. In this event, the valve mechanism 46 will either let some of the air out of the air spring 39 or will allow more air to enter into the air spring 39 until the right end of the cross frame member 13 returns to its initial position with respect to the knuckle support 35 and thereby the front wheel 34 rotatably mounted thereon. Such a relative movement causing such functioning of the valve mechanism 46 may take place, for example, when the vehicle sways to either the right or the left on rounding a curve, or if an unusual amount of weight is placed on the vehicle on one side or the other, tending to raise or lower the front cross frame member with respect to the knuckle support 35.

Let us assume that the vehicle body 24, and, therefore, the frame 10, move downwardly with respect to the knuckle support 35 and the road wheel 34 rotatably mounted thereon such as on rounding a curve, for example. Assume further that this condition continues for a substantial time such as a few seconds. In that event, the cross frame member 13 will act on the connecting rod 44 to pull it in a downward direction and consequently tend to compress the air spring 39. The leveling valve mechanism 46 rigidly connected with the bracket plate 42 will move in a downward direction so that the connecting rod 128 and the arm assembly 127 connected thereto will be moved in a relatively upwardly direction. A corresponding moment is transmitted through the arm assembly 127, and in particular through the arm end 140, the spring 136 and the clevis 131 to the shaft 53. This moment tends to rotate the shaft 53 in a counterclockwise direction as seen in FIG. 4. Although this moment is applied to the shaft 53, the shaft 53 does not initially move due to the thick viscous liquid in the cavity 54 and the vane 55 in the cavity. There is a slight clearance around the vane 55, and in order for the shaft 53 and the vane 55 to move, the viscous fluid must flow around the vane 55 to the other side of it. Initially, therefore, the spring 136 is flexed so as to allow the outer end arm portion 140 of the arm 127 and the connecting rod 128 to move upwardly with respect to the valve body 52, the spring 136 being flexed and having its convolutions separated maintains a steady moment on the shaft 53 so that the vane 55 moves in the cavity 54 with the viscous liquid in the cavity being forced to flow around the edges of the vane 55. Eventually, by this movement of the shaft 53, the lever 60 which is fixed on the shaft 53 strikes the enlarged end 81 of the valve A and moves the valve stem 72 and the enlarged head 73 so that the lip 75 is opened against the closing pressure of the spring 77 and removed from the seat 76. At this time, the air pressure existing in chamber 100 which together with the action of the spring 77 of valve C has been sufficient to keep the enlarged head 73 of the valve C seated against the inlet air pressure is now decreased, thus permitting the enlarged head 73 to become unseated from its seat 76.

The purpose of the raised head 54a in the cavity 54 of the valve body 52 will now be explained. It has been observed that when the bottom of the cavity is flat, there is sometimes a tendency for the leveling valve to hunt, i.e., to overrun the level position and finally correct itself on the second or third oscillation. This, of course, is undesirable. For example, when the valve A was filling due to a moment put on the shaft 53 by bending of the arm 127, the vane 55 would be completely over to the side of the cavity when the car attained the level position. Since there were then no forces on the vane, the vane would only start returning to a neutral position when the car was in the opposite off-level position. Because the damping effect of the fluid helps to provide a large time delay, it would take a considerable time for the vane to retract to a neutral position to permit the inlet valve A to close. This condition, of course, resulted in the car being off level in a direction opposite to what it was originally and the vane would then travel to the exhaust side, thereby opening the exhaust valve C. This cycle would sometimes be repeated two or three times before it stopped in a level position. In order to correct this condition, the undercuts or troughs 54b and 54c have been provided which reduce the time delay i.e., permit faster travel of the vane as the edge of the vane 55 travels over that portion of the cavity. The overtravel of the vane has also been limited by a predetermined spacing between the sides 54d and 54e of the cavity itself. Overtravel is the arc through which the vane travels from the position where the inlet or exhaust valves are initially opened to the a position where the vane hits the side of the cavity.

The time delay from the neutral position of the vane 55 to its position when either the inlet valve A or the exhaust valve B begins to open is also determined by the clearance between the lower edge of the vane 55 and the raised head 54a which runs down the center of the cavity. This damping effect due to the viscous liquid and the clearance between the vane and the cavity prevents the usual sudden road shocks from producing a rotation of the shaft 53 and consequent operation of the valves A or B by the swinging action of the lever 60 attached to the shaft 53. However, once the moment put on the shaft is of long enough predetermined duration, for example, one or two seconds, the vane passes beyond the raised head 54a and the vane travels faster. Thus, the vane moves slowly between fill and exhaust (the positions at which the valves A and B are initially actuated) and rapidly between the fill and fill overtravel and rapidly between the exhaust and exhaust overtravel. Leveling valve mechanisms built with this type of damping mechanism have been found to be totally free from hunting.

The compressor 47, being driven by the vehicle engine 15, supplies a fluid pressure to its outlet conduit 49 which is regulated to a pre-determined value, for example, about 300 p.s.i. by means of the conventional relief valve 51. The air accumulator 50 maintains a supply of this air under predetermined pressure of up to 300 p.s.i., for example. A pressure regulator 51a at the outlet from the accumulator may regulate the pressure down to 150 p.s.i., for example, before the air flows through conduit 99 and into valve C through air hole 80 of valve C. Air continues to flow through valve C around its end lip 76 into chamber 100, through the chamber 100, around the enlarged head 73 of valve A, past its lip 76 and through tapered section 69 and the air hole 80 into the chamber 62. The air now flows from the chamber 62 of the valve body 52 into the bore 111 and passage 112 of the valve 107 of the relay valve assembly 65. When the car is being driven, the restrictor slide valve 109 is kept in its right hand position, i.e., slow-flow position, due to the air spring pressure which, for example, may normally be approximately 90 p.s.i. acting on the left end of the valve 109. Then a transfer of air to the air spring will take place at a restricted rate of flow through the restriction or clearance 120, the passage 114 and conduit 113 to the air spring.

Additional air is thus supplied to the air spring 39 tending to expand the air spring and move the upper plate 29 upwardly with respect to the lower plate 28 so as to cause a similar movement of the front cross member 13 through the connecting rod 44 to return the right end of the cross member 13 to the same relative position with respect to the knuckle support 35 and the wheel 34 mounted thereon. Any lowering or swaying of the vehicle body 24 on frame 10 is thus compensated for to return the vehicle body to a normal position.

On such righting movement of the frame 10 and body 24, the upper plate 29 connected through the rod 44 with the right end of the cross member 13 rises with respect the knuckle support 35 to which the outer portion 140 of the arm assembly 127 is connected by means of the bracket 130. Then the shaft 53 is rotated in the clockwise direction as seen in FIG. 4, so as to return the vane 55 to its original median position, with the viscous liquid in the cavity 54 flowing back around the edges of the vane 55. The lever 60 being connected to the shaft 53 thus allows the spring 77 of the valve A to move the stem 72 back into its original position to seal the enlarged head portion 73 on the lip 76 of the valve A, and the flow of fluid into the air spring 39 thus ceases.

When the valve A is thus again closed, the air pressure in the chamber 100 builds up since the valve C is still open. The increasing pressure in the chamber 100 thus acts upon the enlarged head 73 of the valve C and when this increase in pressure builds up to a point where it is within approximately 5 lbs. of the inlet pressure, the spring 77 of valve C takes over to close the valve by seating the enlarged head 73 on the lip 76.

When the vehicle comes out of the turn, the air spring moves the right end of the front cross member upwardly with respect to the knuckle support 35 and the wheel 34 mounted thereon, and under these conditions, the connecting rod 128 on the end of the arm 127 moves this arm relatively downwardly with respect to the valve body 52. The spring 136 of the arm 127 initially is stressed, with the vane 55 and the viscous liquid preventing corresponding movement of the shaft 53 immediately. Gradually, however, the vane 55 moves clockwise as seen in FIG. 9 through the viscous liquid under the action of the stressed spring 136, and eventually the shaft 53, the vane 55 and the lever arm 60 move sufficiently so that the arm 60 strikes the enlarged head 95 of the exhaust valve B and moves the enlarged portion 89 of the valve B off the lip 91 of the sleeve portion 85 so as to open the valve. When the valve B is open, the chamber 105 between the valves B and D attains a pressure corresponding to that in the chamber 62. Thus, the exhaust check valve D which is of the same type as the valve A and C is opened against the spring pressure exerted by its spring 77. Air in the air spring 39 is thus exhausted through the valves B and D to the atmosphere through the silencer 106. This exhausting of the air causes the top plate 29 of the air spring 39 to lower with a consequent lowering of the right end of the front cross member 13. This lowering causes the connecting rod 128 to move the end of the arm 127 relatively upwardly and causes a corresponding counterclockwise movement of the shaft 53 so as to move the lever 60 out of contact with the stem 88 of the valve B so that the enlarged head portion 89 of the valve B is forced back onto the lip 91 of the sleeve portion 85 under the action of the spring 93, thus stopping the exhausting of air from the air spring 39. When this occurs, the air pressure in the chamber 105 between the valve B and D decreases, thus permitting the spring 77 of the valve D to reseat the enlarged head 73 on the lip 76 of the valve B. The right end of the front cross member is thus returned to its proper predetermined position with respect to the knuckle support 35 and the front wheel 34 rotatably mounted thereon.

In the event that the right side of the vehicle 10 tends initially to move upwardly, as when the vehicle is making a right hand turn, the arm 127 and the connecting link 128 causes the lever 60 to first move to actuate and open the exhaust valve B so as to decrease the amount of air in the air spring 39. The lever 60, when the correct positioning of the right end of the front cross member 13 with respect to the knuckle support 35 is reached, will move to allow the exhaust valve B to close. Then when the vehicle tends to right itself on a subsequent straight of way, for example, the lever 60 will be moved to open directly the inlet valve A and indirectly the inlet check valve C and reinflate the air spring 39.

As has been previously described, the spring 136 is preloaded, so that it requires considerable force to separate the convolutions of the spring. My co-pending application, S.N. 618,837, explains and illustrates the force required to effect a certain deflection of a spring of the type herein disclosed. Only a slight relative movement between the knuckle support 35 and the wheel 34 mounted thereon with respect to the adjacent end of the front cross member 13 of the frame 10 is needed in order to put a moment on the shaft 53. The leveling valve mechanism 46 is very sensitive in maintaining the adjacent end of the front cross member 13 at the correct predetermined level with respect to the knuckle support 35 and the wheel 34 mounted thereon. It will be understood that the vane 55 within the body of viscous liquid in the cavity 54 moves only very slowly within the cavity, and, therefore, although there is a moment on the shaft 53 from the arm assembly 127, there is a predetermined time delay before actual movement of the shaft 53 takes place. Therefore, neither of the valves A and B is actuated by only the usual jars and road shocks encountered by the vehicle which are very short in duration. Such normal road shocks simply cause flexing of the spring 136 without corresponding movement of the shaft 53 since the vane 55 within the body of viscous liquid has a damping effect and prevents the rotation of the shaft 53 unless there is a prolonged moment thereon. A prolonged change in position between the adjacent end of the front cross member 13 and the adjacent wheel 34 is necessary before the valve mechanism 46 functions to correct the position of the front cross member 13 by either relieving air out of the air spring 39 or filling it to a greater extent from the compressor 47. The lever 60 has only a limited swinging movement in the narrow chamber 62 and thus the rotation of the shaft 53 is correspondingly limited. If there is a relatively large change in position between the cross member 13 and the adjacent wheel 34, the shaft 53 cannot rotate correspondingly and the arm assembly 136 thus remains bent, even after the valve A or the valve B is open. The arm assembly 127 thus is effective also for compensating for the relatively small rotation that the shaft 53 may have.

One of the primary reasons for the restriction 120 of the restrictor valve 109 is to assist in making corrections going in and out of curves and especially to make a slow correction coming out of a curve. It is not so important that fast leveling take place going into a curve, but it is important in coming out of a curve that leveling action take place slowly instead of fast. If the correction is made fast, this causes considerable discomfort for the driver. Accordingly, the restrictor valve 109, being normally in a closed or right-hand position, permits a restricted or slow flow of air between the air spring and the chamber 62.

Assume now another situation in which the standing height of the vehicle is altered by someone getting in or out of the car and the car door 173 is opened. In such a case, the coil 165 is energized to open the solenoid operated valve 157. This solenoid signal permits air pressure from the accumulator 50 to act through conduit 164 to move the valve head 160 from its seat 161. This permits air to flow through conduit 168 to opening 124 at the right side of the T-relay valve 107 to move the restrictor slide valve 109 to the left so that the passage 114 in the slide valve 109 is lined up with the passage 112 in the valve body 107, thus conditioning the relay valve 107 for fast flow between the air spring and chamber 62 in the valve body 52. In other words, the restrictor valve of the relay valve assembly is now in an open position or a fast flow position which will permit a free flow of air between the inlet and the air spring or between the air spring and exhaust depending on which action is necessary to bring the vehicle body 24 back to its normal position with respect to the knuckle supports 35 and 36. The system may be designed, for example, to permit in a fast flow condition a free flow of air at approximately 1500 cu. in. of air at approximately 90 p.s.i. air spring pressure. It will be appreciated that a similar relay valve assembly might be installed in other portions of an air suspension leveling system. It would only be necessary to connect an air inlet source such as that from chamber 62 of the leveling valve mechanism 46 in any suitable manner, such as by tubing, for example, to the bore 111 of the relay valve assembly 65. The restrictor slide valve 109 could still be actuated by a solenoid-actuated pressure source to move the restrictor slide valve 109 to a fast-flow position or be maintained in a slow-flow position such that the restriction would be effective to meter the amount of air being transferred.

The solenoid signal may also be produced by the operation of a trunk light switch which energizes coil 165 when the trunk is opened.

Figure 16:
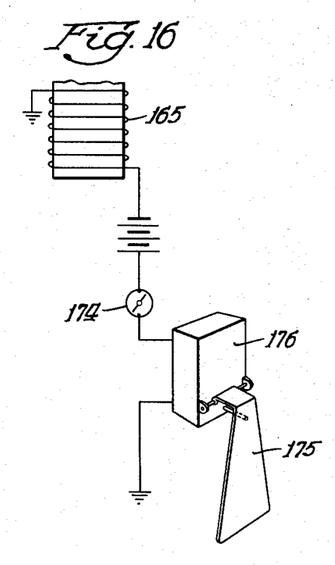
FIG. 16 is a schematic diagram showing a wind operated vane for actuating the solenoid valve.
Figures 17, 18:
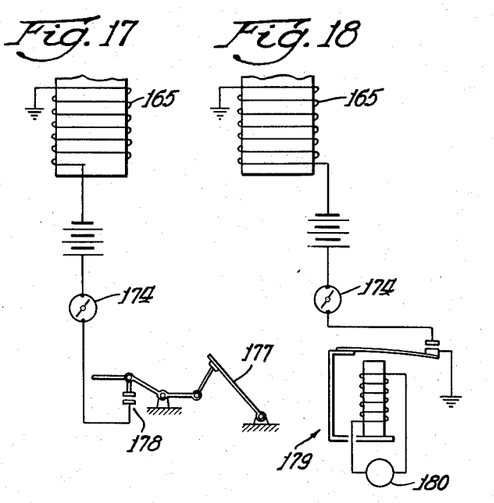
FIG. 17 is a schematic diagram showing foot pedal accelerator mechanism for actuating the solenoid valve.
FIG. 18 is a schematic diagram showing voltage sensitive relay for actuating the solenoid valve.

Other embodiments showing how the coil 165 may be energized are illustrated in FIGS. 16, 17 and 18. These are essentially speed responsive devices. FIG. 16 illustrates a wind vane 175 actuated by the speed of the vehicle. With this type of device, the electrical circuit would normally be energized and the restrictor valve 109, therefore, would normally be in the open or fast-flow position. As the vehicle assumes a predetermined speed, the vane 175 would be actuated to open switch 176 to open the electrical circuit thus permitting the solenoid operated valve to close and in turn, the restrictor valve 109 to assume a closed or slow-flow position.

FIG. 17 illustrates how the coil 165 may be deenergized by depressing an accelerator 177. Depressing the accelerator 177 would cause the switch 178 to open, thus opening a normally closed electrical circuit to deenergize the coil 165, close valve 157 and permit the restrictor valve to assume a closed or slow-flow position.

FIG. 18 illustrates an embodiment in which the coil 165 is deenergized by operation of a voltage sensitive relay 179 operated by the voltage of the electrical generator 180 of the vehicle. As the engine speed increases and generator voltage increases, the circuit deenergizes the coil 165 thus permitting the restrictor slide valve 109 to assume a slow-flow position.

Referring now specifically to what occurs when too much air pressure is present in the air spring 39 and the air spring must be exhausted to return the vehicle body to a normal standing height. In such a case, the lever 60 in chamber 62 moves to open valve B. This, now, permits an air flow from the spring through the conduit 113, the passage 114, the restriction or clearance 120, the passage 112, valve B and eventually valve D, if the pressure in the chamber 105 between valve B and D builds up to more than 40 p.s.i., for example. The moment, however, the pressure drops to below 40 p.s.i. in chamber 105, the spring-loaded valve D will automatically close. This 40 p.s.i. is then spoken of as the blow-off pressure of valve D. Thus, when the blow-off pressure of valve D, namely, 40 p.s.i., is exceeded, valve D will be opened against the spring pressure of its spring 77 which tends to keep the valve D closed. Once the pressure in chamber 105 falls below 40 p.s.i., the spring pressure will close valve D and prevent exhausting of the air.

One of the purposes served by valve D is that of a back-up or safety valve for valve B especially when high line pressures are used. In other words, if valve D were not present to operate as an exhaust check valve, damage to valve B, especially when operating under high line pressures, may result in escape of all the air from the particular air spring which the valve B helps to control. However, with exhaust check valve D in the system, the air spring pressure will never drop below 40 p.s.i. Note that 40 p.s.i. has here been used merely as an illustrative blow-off pressure for the exhaust check valve D. That pressure may be varied with the construction of the valve, and depends primarily on the strength of the spring 77 which tends to seat the enlarged head 73 on the lip 76. If no exhaust check valve D is used, the use of high line pressures would require a strong spring 93 in the exhaust valve B to keep the latter from blowing off when, for example, air is admitted into the chamber 62. The added valve D permits a weaker spring 93 to be used and assists in preventing such blowoff because the pressure in chamber 105 is added to the pressure exerted by spring 93 of valve B to keep valve B closed.

As mentioned before, valve D is of the same construction as valve A. This is so with the exception that the strength of the spring 77 of the valve D may be varied depending on the blowoff pressure desired.

The exhaust check valve D serves still another purpose. For example, if the vehicle is jacked up and the tilting of the vehicle body causes the exhausting of the air spring 39, then the air spring 39 will exhaust to a certain point, but will not exhaust to a pressure below 40 p.s.i., valve D being spring-loaded so as to prevent exhausting of air below that pressure.

As mentioned before, the pressure in the chamber 62 is generally less than the regulated inlet pressure. Since only a small differential in pressure exists between the regulated inlet pressure and the pressure in chamber 100 between the valve A and C, and the relatively high pressure in the chamber 100 acts on the enlarged heads 73 of valve A and valve C, only a relatively light spring 77 is necessary in valve C to keep the head portion 73 sealed on its lip 76. Likewise, in valve A, only a weak spring 77 is necessary to keep the enlarged head 73 seated on the lip 76 of the valve A.

On the other hand, since the pressure in chamber 62 is effective through the air hole 95 of valve B and the internal passage of the sleeve 87 to tend to force the head 89 of the valve B from the end lip 91 a relatively heavy spring 93 is necessary to keep the head 89 in sealing relation with lip 91.

The main purpose of the inlet check valve C is to prevent leakage of air from the air spring should a leak in the air system take place such as a breakdown of the air compressor, a leak in the accumulator or other damage which would reduce the regulated line pressure below normal. It may be observed that if the inlet pressure is cut off altogether and there were no valve C, the pressure in chamber 62 would open valve A and air would leak out of the air spring down to a pressure where spring 77 of valve A is sufficient to close valve A against the remaining pressure in chamber 62. However, with an inlet check valve C attached, if the inlet pressure is cut off altogether, the pressure existing in chamber 100 between valves A and C acts on the enlarged head 73 of valve C to keep valve C closed, thus preventing exhausting of the air through the inlet end. The spring 77 of the valve C should be a relatively weak spring of the order, for example, of 2–4 lbs. The reason for this is that it is generally desirable to keep the pressure drop across the valve C as low as possible so that as much of the regulated line pressure as possible will be available for filling.

The pressure in the chamber 62 of the valve body 52 and in the connected air spring is generally less than the pressure in accumulator 50. Typical pressures which may exist at various places in the system are as follows:

| | P.s.i. |
|---|---|
| Air spring pressure | 90 |
| Regulated line pressure in conduit 99 | 150 |
| Differential spring pressure on valve A | 5 |
| Blow-off pressure on valve B | 120 |
| Differential spring pressure on valve C | 2 |
| Blow-off pressure on valve D | 40 |

Differential spring pressure on valve A is that spring pressure tending to hold valve A closed.

Blow-off pressure on valve B may be defined as that pressure in chamber 62 necessary to open valve B against the combined pressure of spring 93 and the pressure in chamber 105 acting against valve head 89 of valve B.

Differential spring pressure on valve C is that spring pressure tending to keep valve C closed.

The valve 46A functions in the same manner as the valve 46 in order to maintain the left end of the front cross member 13 of the frame 10 at a predetermined height with respect to the knuckle support 35 and the road wheel 34 rotatably mounted thereon.

The valve 46B together with its arm assembly 127 functions to maintain the spacing between the rear axle assembly 18 and the body 24 at the predetermined distance in the same manner as the valves 46 and 46A function with respect to the ends of the front cross member of the frame 10 and the knuckle supports 35 and 36. When the body 24 is too low, relative to the rear axle assembly 18, the arm assembly 127 is moved relatively upwardly at its end by means of a connecting rod 154, so that the leveling valve mechanism 46B is effective to supply additional fluid under pressure to the T fitting 150 and the conduits 151 and 152 leading from the T 150 and connected to the air springs 25 and 26. On the other hand, if the body 24 at the rear of the vehicle is too high with respect to the axle assembly 18, the arm assembly 127 is moved relatively downwardly, due to the action of the connecting rod 154, and the valve mechanism 46B is effective to exhaust some of the air from the air springs 25 and 26 through the conduits 151 and 152 and the T fitting 150. The only substantial difference in the operation of the valve mechanism 46B as compared to the valve 46 and 46A is that the valve 46B is effective on the two air springs 25 and 26 instead of simply on one air spring. The two valves 46 and 46A are relied upon for maintaining the vehicle frame 10 and the body 24 level against side sway and the single valve mechanism 46B functions primarily to maintain the frame 10 and the body 24 level about an axis perpendicular to the direction of travel. However, as mentioned before, the system could be arranged that a leveling valve mechanism similar to 46B be provided for each of the air springs 25 and 26.

The embodiment shown in FIG. 6 may be substituted for either of the leveling valves 46, 46A or 46B. As earlier explained, the FIG. 6 embodiment is the same as that in FIG. 4 with the exception that a different type of relay valve assembly 181 is attached to the valve body 52. Solenoid actuated line pressure operates through the passage 191 to actuate the piston 187 to open the restrictor valve 184 by moving the stem 194 in an upward direction. This, then, puts the relay valve assembly in a fast-flow position for air to pass to the air spring 39 or from the air spring 39 at a fast rate of flow.

When the solenoid is not energized so that the piston 187 is in the position shown in FIG. 6, the restrictor valve is in a closed or slow-flow position. Thus, any air flow which takes place to or from an attached air spring must flow through restricted passage comprising the inside thread 202 and notch 203.

The valve mechanism 205 shown in FIG. 10 is the same as that shown in FIG. 4 with the exception that there is no inlet check valve C or an exhaust check valve D. The mechanism 205 includes the improved time-delay mechanism shown in FIG. 9 and hereinbefore explained.

While exhaust valve B of the valve mechanism 205 is of the same type as the exhaust valve B of valve mechanism 46, the spring 93 will have to be much stronger since it is the only force preventing the valve B from exhausting at a predetermined pressure. This is in contrast to the additional pressure available in the chamber 105 of the valve mechanism 46 acting on the back side of valve B to help in keeping it closed.

In summary, therefore, this invention advantageously provides an improved time delay mechanism to eliminate hunting of the leveling valve mechanism when the vehicle body is being returned to its normal position. There is also provided, in addition, a relay valve assembly, having a restrictor valve which makes it possible to put air into an air spring or permit air to be exhausted from an air spring at two different rates of flow. This relay valve mechanism advantageously provides a restricted flow position when gradual leveling is desired, as when the vehicle is coming out of a curve, for example, and provides a fast-flow position providing an opportunity for a quick movement of air to or from an air spring when fast leveling is desired. This invention also provides inlet and exhaust check valves. The inlet check valve prevents leakage of air from an air spring, that is, a backing up of the air in case the air system develops a leak and air is lost generally throughout the system. The exhaust check valve prevents a complete exhausting of air from an air spring in the case of damage to the exhaust valve proper, or in the case of air leakage in the system.

I wish it to be understood that the invention is not to be limited to the specific constructions and arrangements shown and described, except only insofar as the claims may be so limited, as it will be apparent to those skilled in the art that changes may be made without departing from the principle of the invention.

I claim:

1. In a vehicle suspension system a device for controlling the amount of air in an air spring comprising in combination the combination of: a valve body; an air inlet valve in said valve body; an air exhaust valve in said valve body; a non-return inlet check valve connected to said inlet valve; an exhaust check valve connected to said exhaust valve; a rotatable shaft in said valve body; a lever fixed to said shaft for actuating either said inlet or exhaust valve depending on the direction of rotation of said shaft; means defining a chamber in said valve body and associated with said air inlet valve and said air exhaust valve; means in said valve body defining a cavity; a vane fixed to said shaft in spaced relation to said lever, said vane being disposed within said cavity and a viscous liquid in said cavity, said vane being so arranged so as to allow flow of said viscous liquid from one side of said vane to the other within said cavity so that said viscous liquid imposes a drag on said vane and thereby on said shaft whereby said lever can be moved to actuate either of said valves by a sustained moment applied to said shaft; and a relay valve assembly associated with said valve body for passing air between said chamber and an air spring, said relay valve assembly comprising a restrictor valve for regulating the rate of air flow to or from the air spring, means defining a relatively small clearance in said restrictor valve for allowing a relatively small amount of air to pass between said chamber and the air spring when said restrictor valve is in a closed position, and means defining a relatively large opening in said resetrictor valve for allowing a relatively large amount of air to pass between said chamber and the air spring when said restrictor valve is in an open position.

2. In a vehicle air suspension system a device for controlling the rate of air transfer to or from an air spring comprising in combination: a valve body having a port connectible to the air spring; flow control valve means in said valve body to govern the rate of flow through said port, said valve means comprising a freely reciprocable plunger in said valve body adapted to be moved axially by fluid pressure only, means defining a passage in said plunger for allowing a relatively fast transfer of air through said port when said plunger is in a first position, and means defining a restricted path of flow for a relatively slow transfer of air through said port when said plunger is in a second position said last mentioned means comprising a land on the circumference of said plunger.

3. In a leveling valve system adapted to regulate the air pressure in the air springs of a vehicle suspension system, a control valve comprising: a valve body; a freely slidable plunger disposed in a bore in said valve body adapted to be actuated only by a fluid pressure exerted at either end thereof, said plunger having an axial conduit extending through a portion of the length of said plunger; means defining a fluid passage in said valve body intersecting said bore; means defining a transverse passage in said plunger which intersects said axial conduit; said valve being conditioned for a fast flow of air when said transverse passage is in registry with said fluid passage.

4. In a vehicle air suspension system, a device for controlling the rate of air transfer to or from an air spring comprising in combination: a valve body; inlet means in said valve body; outlet means in said valve body for connecting with the air spring; flow control valve means in said valve body to govern the rate of flow to and from the air spring, said valve means comprising a freely reciprocable slidable plunger in a bore in said valve body, adapted to be positioned only by air pressure on either end thereof; means defining a passage in said slidable plunger; means defining a completely circumferentially extending clearance on said plunger; said valve means allowing a relatively fast transfer of air between said inlet means and said outlet means when said plunger passage means is in direct registry with said inlet means and a relatively slow transfer when said plunger clearance means is in direct registry with said inlet means.

5. An air spring control device for controlling the amount of air in an air spring comprising: a valve body, an air inlet valve in said valve body, an air exhaust valve in said valve body; a rotatable shaft in said valve body carrying a lever, said lever being adapted to actuate either of said valves depending on the direction of rotation of said shaft; means defining a chamber in said valve body between said air inlet valve and said air exhaust valve; a relay valve assembly connected to said chamber for passing air between said chamber and said air spring comprising a second valve body, a freely reciprocable plunger-type restrictor valve slidably mounted in said second valve body for regulating the rate of flow of air between said chamber and air spring, said restrictor valve being adapted to be moved axially by fluid pressure only, means defining a bleed passage in said restrictor valve for allowing a relatively small amount of air to pass when said restrictor valve is in a closed position and means defining a longitudinal conduit in said restrictor valve for allowing a relatively large amount of air to pass when said restrictor valve is in an open position.

6. In a leveling valve mechanism of a vehicle air suspension system for controlling the amount of air in air springs by selective actuation of air inlet and air exhaust valves, an anti-hunt damping device comprising: a valve body having a cavity formed therein; a viscous fluid in said cavity; a rotatable part for actuating said valves and mounted in said valve body; a vane connected to said part and swingably disposed in the viscous fluid in said cavity; a raised head formed along the length of the bottom of said cavity; and means defining undercuts on each side of said raised head for permitting the vane to swing faster when passing over said undercuts than when it passes over said raised head.

7. In a leveling valve mechanism the combination comprising: a valve body having a cavity formed therein; an air inlet valve in said valve body; an air exhaust valve in said valve body; a viscous fluid in said cavity; a rotatable member mounted in said valve body and movable to either side of a neutral position to actuate said valves and including a part swingably disposed in the viscous fluid in said cavity to provide a damping effect when said rotatable member is rotated; and a raised portion formed in said cavity adjacent said neutral position of said member to provide an increased damping effect.

References Cited in the file of this patent

UNITED STATES PATENTS

| | | |
|---|---|---|
| 1,369,946 | Tibbetts | Mar. 1, 1921 |
| 1,371,648 | Schmidt | Mar. 15, 1921 |
| 1,951,483 | Knapp | Mar. 20, 1934 |
| 2,490,311 | Rostu | Dec. 6, 1949 |
| 2,670,201 | Rossman | Feb. 23, 1954 |
| 2,745,430 | Slomer | May 15, 1956 |
| 2,787,475 | Jackson | Apr. 2, 1957 |
| 2,844,384 | Jackson | July 22, 1958 |
| 2,848,249 | Bertsch | Aug. 19, 1958 |
| 2,918,303 | Brown | Dec. 22, 1959 |
| 2,947,530 | Davis | Aug. 2, 1060 |
| 2,949,316 | Davies | Aug. 16, 1960 |

OTHER REFERENCES

The Autocar Magazine, March 14, 1958, page 367.
SAE Journal, publication, February 1958 (pages 50, 59, 60).